United States Patent [19]
Mayer

[11] Patent Number: 5,768,883
[45] Date of Patent: Jun. 23, 1998

[54] FLOWRATE CONTROL SYTEM AND METHOD

[75] Inventor: Christopher R. Mayer, Wilmington, Mass.

[73] Assignee: Ametek Aerospace Products Inc., Wilmington, Mass.

[21] Appl. No.: 599,507

[22] Filed: Jan. 25, 1996

[51] Int. Cl.[6] ........................................................ F02C 9/26
[52] U.S. Cl. ........................ 60/39.03; 60/39.281; 137/83
[58] Field of Search ............................ 680/39.03, 39.281, 680/39.282, 243, 734; 137/83, 118.02

[56] References Cited

U.S. PATENT DOCUMENTS

| | | | |
|---|---|---|---|
| 3,386,343 | 6/1968 | Gray | 137/83 |
| 4,010,767 | 3/1977 | Cornell | 137/83 |
| 4,167,169 | 9/1979 | White | 123/140 |
| 4,397,148 | 8/1983 | Stockton et al. | 60/235 |
| 4,658,855 | 4/1987 | Doyle | 137/468 |
| 4,664,084 | 5/1987 | Wheelock | 123/462 |
| 4,687,020 | 8/1987 | Doyle | 137/486 |
| 4,745,739 | 5/1988 | Bezard et al. | 60/39.281 |
| 4,751,942 | 6/1988 | Dyer et al. | 37/599 |
| 4,760,662 | 8/1988 | Dyer et al. | 60/39.281 |
| 4,763,626 | 8/1988 | Staerzl | 123/438 |
| 5,065,717 | 11/1991 | Hosokai et al. | 123/339 |
| 5,092,748 | 3/1992 | Simmons, II | 417/423 |
| 5,116,362 | 5/1992 | Arline et al. | 60/734 |
| 5,190,020 | 3/1993 | Cho | 123/684 |
| 5,279,107 | 1/1994 | Meisner et al. | 60/39.03 |

OTHER PUBLICATIONS

"Fuel–Metering Valve Design Innovations", Oct. 1993; pp. 1, 9; Aerospace Engineering.

*Primary Examiner*—Louis J. Casaregola
*Attorney, Agent, or Firm*—Hayes, Soloway, Hennessey, Grossman & Hage, P.C.

[57] ABSTRACT

A system and method for controlling fluid mass-flowrate are provided. One embodiment of the method of the present invention essentially comprises generating in response to a requested mass-fluid flowrate a torque for controlling a torque-controlled valve to provide a flow of fluid from a supply to a remote space. Angular momentum is imparted to the fluid flow related to the actual mass-flowrate of the fluid flow. The angular momentum of the fluid flow generates a feedback torque therewith for counter-acting the controlling torque. The feedback torque is summed with the controlling torque to reduce the controlling torque as a function of the feedback torque whereby to form a hydromechanical closed-loop mass-flowrate servo-valve.

21 Claims, 4 Drawing Sheets

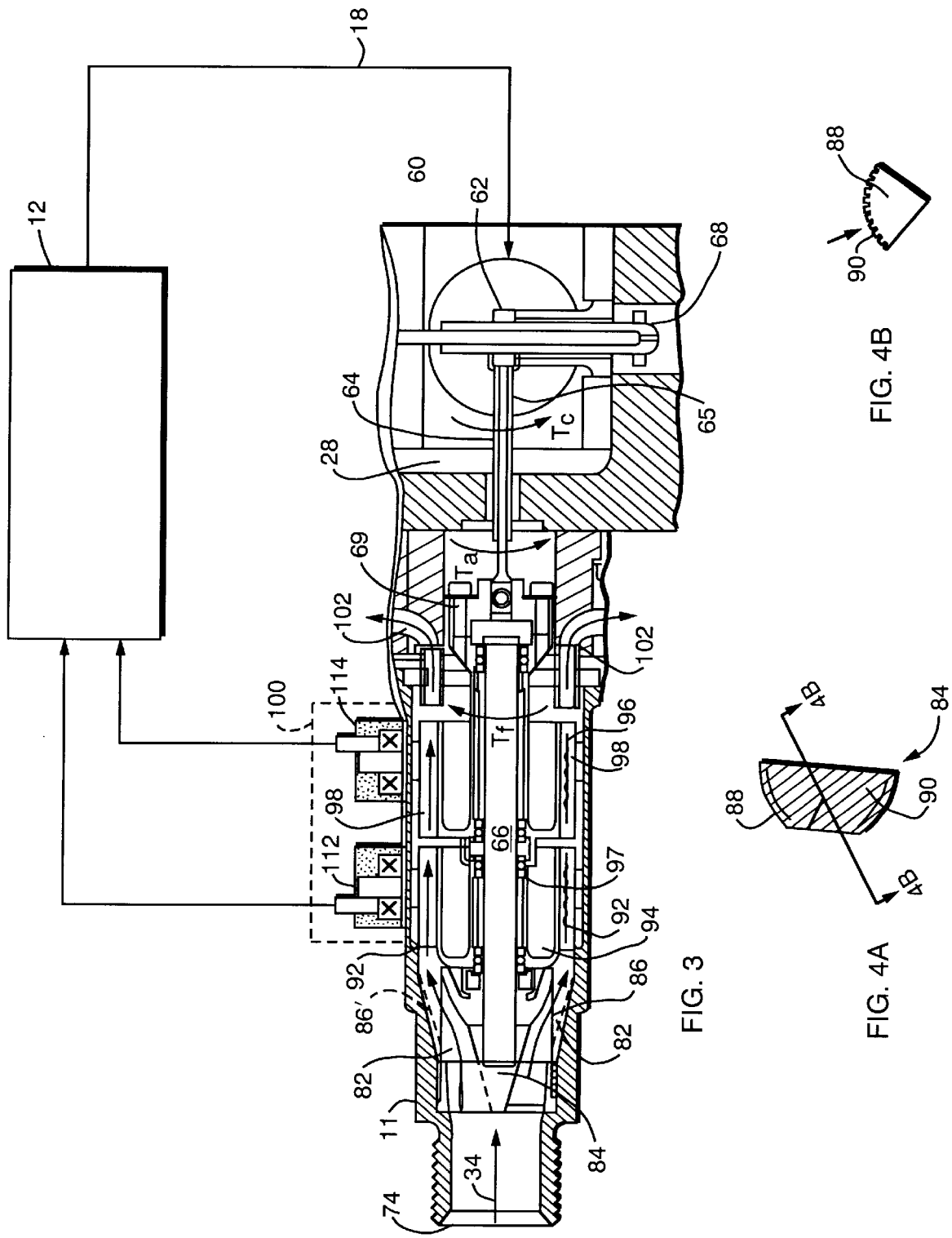

FLOWRATE CONTROL SYTEM AND METHOD

BACKGROUND OF THE INVENTION

1. Field of the Invention

The present invention relates generally to a fluid flow control system and method, and more specifically, to a liquid fuel mass flowrate control system and method. Particular utility for the present invention is found in the area of regulation of fuel mass-flowrate in aircraft engines, although other utilities are contemplated, including other liquid flowrate control applications.

2. Brief Description of Related Prior Art

The prior art is replete with electronic and electromechanical systems for controlling or regulating fuel flowrate in liquid fuel combustion systems. Aircraft engines commonly employ a hydromechanical "flowbody" or main fuel control systems to regulate fuel flowrate to the turbine engine. Such fuel control systems receive fuel mass-flowrate commands in the form of electric signals (e.g., input currents proportional to desired fuel mass-flowrate) generated by an engine control computer. These electrical signals actuate an electromechanical servovalve that positions a moveable metering piston relative to a fuel-admitting orifice in a pressurized fuel source to cause a certain volumetric flowrate to be admitted from the source, through the orifice, and to the engine combustors. The piston position vs. volumetric fuel flowrate and electrical signals vs. piston position characteristics of the system are determined and calibrated in advance, and are programmed into the control computer so that it can generate accurate mass flow commands in response to the engine demand.

It has been found that the density of fuel flowing through the control system can vary as much as ±20%, depending upon the temperature of the fuel and/or the chemical "base stock" or batch from which the fuel was refined. Disadvantageously, this requires temperature sensitive compensation mechanisms that reduce the error between commanded and delivered mass-flowrate to acceptable levels, and adds undesired complexity to the fuel controller.

Further disadvantageously, it has been found that the fuel metering valves in such prior art systems can jam under certain conditions of fuel contamination, such that the metering valve becomes locked in a fixed position (i.e., so as to cause loss of control of engine thrust). These problems occasionally render such prior art fuel control systems inoperable and are particularly unfortunate, since proper fuel control is essential to proper engine performance. Typically, such prior art systems do not include means for directly measuring the actual flowrate being admitted by the orifice, thereby making it essentially impossible for such problems to be found and corrected prior to occurrence of failure.

Prior art of general relevance to the present invention is disclosed in White, U.S. Pat. No. 4,167,169; Doyle, U.S. Pat. No. 4,687,020; and Hosokai et al., U.S. Pat. No. 5,065,717. All of these prior art systems suffer from the aforesaid and/or other disadvantages.

OBJECTS OF THE INVENTION

It is therefore a general object of the present invention to provide a fluid flowrate control system and method that overcome the disadvantages and drawbacks of the prior art, and more specifically, to provide such a system and method that are more accurate and reliable than the prior art.

SUMMARY OF THE INVENTION

The present invention provides an improved method and system for controlling fluid flow. In one embodiment of the present invention, means are provided for generating a command torque related to a requested mass flowrate of fluid to be released from a source of said fluid. A torque-controlled valve is provided for releasing an actual mass flowrate of the fluid from the source in response to the command torque. Also included are means for generating a feedback torque related to the actual mass flowrate. The feedback torque is opposite in direction to the controlling torque. Finally, means are provided for summing the feedback torque with the command torque to reduce the command torque by the feedback torque whereby to adjust actual flowrate of fluid released by the valve as a function of the feedback torque. A closed-loop hydro-mechanical feedback control system is thereby implemented. The resulting system not only does not suffer from the aforesaid disadvantages of the prior art, it is far more accurate and reliable than the aforesaid prior art systems. For example, the system of the present invention permits desired mass-flowrate of fluid to be output by the system without requiring complicated fluid density compensation and permits the mass-flowrate to be measured directly, thereby permitting more accurate monitoring of the fluid flowrate.

These and other advantages, aims, and objectives of the present invention will be become apparent as the following detailed Description taken with reference to the Drawings wherein like numbers depict like parts, and wherein:

BRIEF DESCRIPTION OF THE DRAWINGS

FIG. 3 is an even more detailed longitudinal schematic diagram of preferred structures for the embodiment of FIGS. 1–2, in which diagram the spool valve, main supply, piston valve and the pressurizing valve of FIG. 2 have been removed;

FIG. 4A is a partial outer surface view of the swirler of FIGS. 4B—4B;

FIG. 4B is a partial cross-sectional view taken along lines B—B of FIG. 4A to illustrate the configuration of the helical grooves of the swirler;

While the present invention will hereinafter be described in connection with preferred embodiments thereof, and in connection with preferred methods of use (e.g., in connection with being used to control liquid fuel flowrate from a pressurized fuel source to combustor in an aircraft engine), it will be understood that it is not intended to limit the invention to these embodiments and methods of use. On the contrary, it is intended to cover all alternatives, modifications, and equivalents as may be included within the spirit and broad scope of the invention as only defined by the hereinafter appended claims.

DETAILED DESCRIPTION OF PREFERRED EMBODIMENTS

Functional Description

Figure 1:
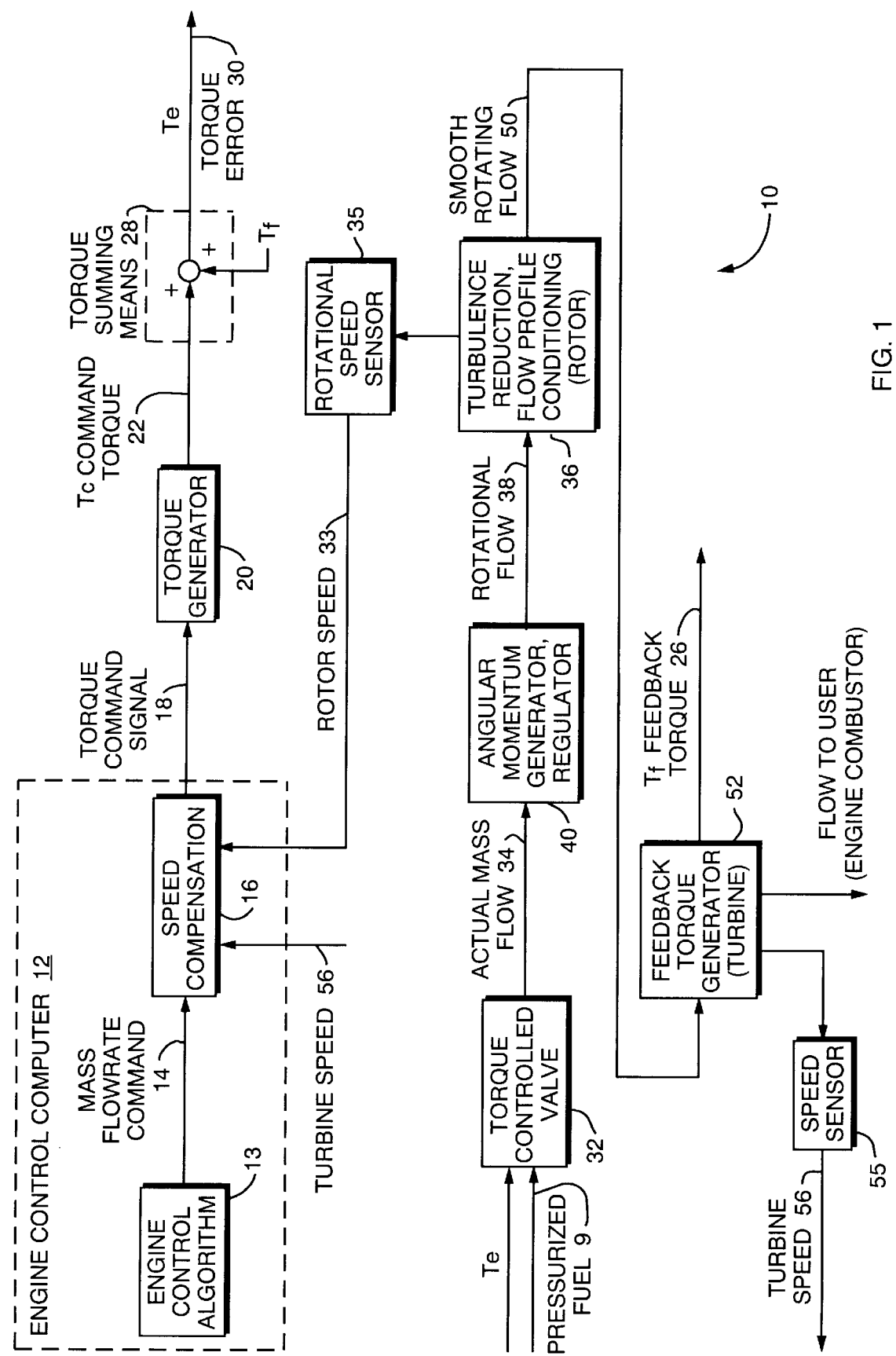
FIG. 1 is a schematic block diagram showing the various functional components of a preferred embodiment of the fluid flow control system of the present invention.

FIG. 1 is a block diagram of the various functional components of one preferred embodiment 10 of the system of the present invention, which diagram will be used to facilitate discussion of the operation of embodiment 10. The preferred structures used to construct the various functional components of embodiment 10 will be described in greater detail in a following section with reference to FIGS. 2–4B.

As shown in FIG. 1, embodiment 10 comprises a conventional engine control computer means 12 (e.g., a FADEC-type mechanism) for generating a mass flow-rate command 14 based upon its engine control algorithm 13. Command 14 is supplied to conventional means 16 for generating a torque command signal 18 (e.g., an electrical signal related to the commanded mass-flowrate) in response to the commands 14, and the turbine speed, 56, and rotor speed, 33.

The torque command signals 18 is supplied to conventional means 20 for generating a controlling torque (Tc) 22 in response to the signals 18. The magnitude of the torque 22 generated by the means 20 is related to (e.g., proportional to) the signals 18 supplied to the means 20, and thus, is also related to the mass flowrate command 14.

Controlling torque 22 is summed by a torque summing means 28 with a counter-acting feedback torque 26 (which is generated by means which will be described shortly) to generate an error torque (Te) 30. Feedback torque 26 is opposite to the controlling torque 22.

For reasons that will become apparent below, initially (i.e., prior to generation of a flowrate command 14) the feedback torque, 26, equals zero. Error torque 30 is used to actuate a conventional torque-controlled valve 32 (i.e., the flowrate 34 from valve 32 changes as a function of error torque 30) to provide a controlled actual mass flowrate 34 of fluid from a fluid source to the combustor.

Conventional means 40 is then used to impart angular momentum to the fluid flow 34 related to the fluid's mass flowrate. A further function of the means 40 is to coarsely regulate rotational speed or amount of angular momentum. This produces a fluid flow 38 having an angular momentum related to its mass flowrate.

Conventional means 36 for reducing the turbulence of the fluid flow 38 is then used to produce a fluid flow 50 having reduced turbulence and uniform flow profile at the exit end of the flow passage, in order to improve the performance of the control system 10. Preferably, turbulence reducing means 36 also includes means for detecting speed of rotation 33 of the rotor, which speed 35 is indicated to the rotor speed compensator 16 which uses this information in generating the command signal 18.

Fluid flow 50 is then passed through means 52 for generating feedback torque 26, the magnitude of which is related to the angular momentum and thus also to the mass flowrate of flow 50. By design and layout of components, the feedback torque 26 opposes the error torque 30. Flow passes out of the torque generator free of angular momentum, and onto the user or engine combustion. The feedback torque is supplied to the torque summing means and processed in the system in the manner described previously. Speed sensor 55 senses the angular velocity of the feedback torque generator 52 and transmits its signal to the speed compensator 16. This provides means for compensator 16 to use this information to adjust signal 18 so as to dampen motion of the generator 52.

In operation, when the engine is started, the computer algorithms generate the flowrate command that is supplied to the speed compensator, which, in response to the flowrate command and rotor and turbine speed signals, generates commanded torque signal. The command torque signal then causes the torque generator to generate the command torque, which torque is passed through the torque summing means unchanged (since the feedback torque is initially zero, and thus when summed to the controlling torque in the torque adding means does not adjust the controlling torque) to actuate the torque-controlled valve to provide a fluid flow at an initial flowrate from the source related to the magnitude of the command torque. This initial flow is treated by the angular momentum generator to provide a flow of the the fluid having an angular momentum related to the fluid flow's mass flowrate. The fluid flow with the imparted angular momentum is then treated by the fluid turbulence reducing and flow profile conditioning means to reduce its turbulence and to improve the accuracy of the angular momentum generator. At this point, the actual mass-flowrate of the fluid is sensed by the feedback torque generating means and fed to the compensator 16. The feedback torque is generated by the feedback torque generating means. The feedback torque is then applied to the torque summing means where it is summed with the command torque whereby to generate the error torque applied to the torque-controlled valve. Flow then exits the system and passes to the combustor.

As stated previously, the torque-controlled valve is adapted to change the flowrate of fluid depending upon the error torque applied to the valve. In other words, when the error torque increases, the flowrate permitted by the torque-controlled valve increases, and when the adjusted torque decreases, the flowrate decreases. Also, as the feedback torque increases (all other system parameters being considered constant), the error torque decreases accordingly.

In accordance with the present invention, the various functional components of the system 10 are carefully adjusted, calibrated, and/or adapted (in ways that will be described more fully below) such that (at steady state equilibrium conditions), when the actual mass flowrate of the fluid is substantially equal to the requested mass flowrate, the feedback torque and the command torque also are substantially equal to each other. This causes the error torque applied to the torque-controlled valve to be substantially equal to zero, and thus the mass actual flowrate permitted by the valve remains substantially constant at the commanded mass flowrate.

Structural Description of Preferred Embodiments

Figure 2:
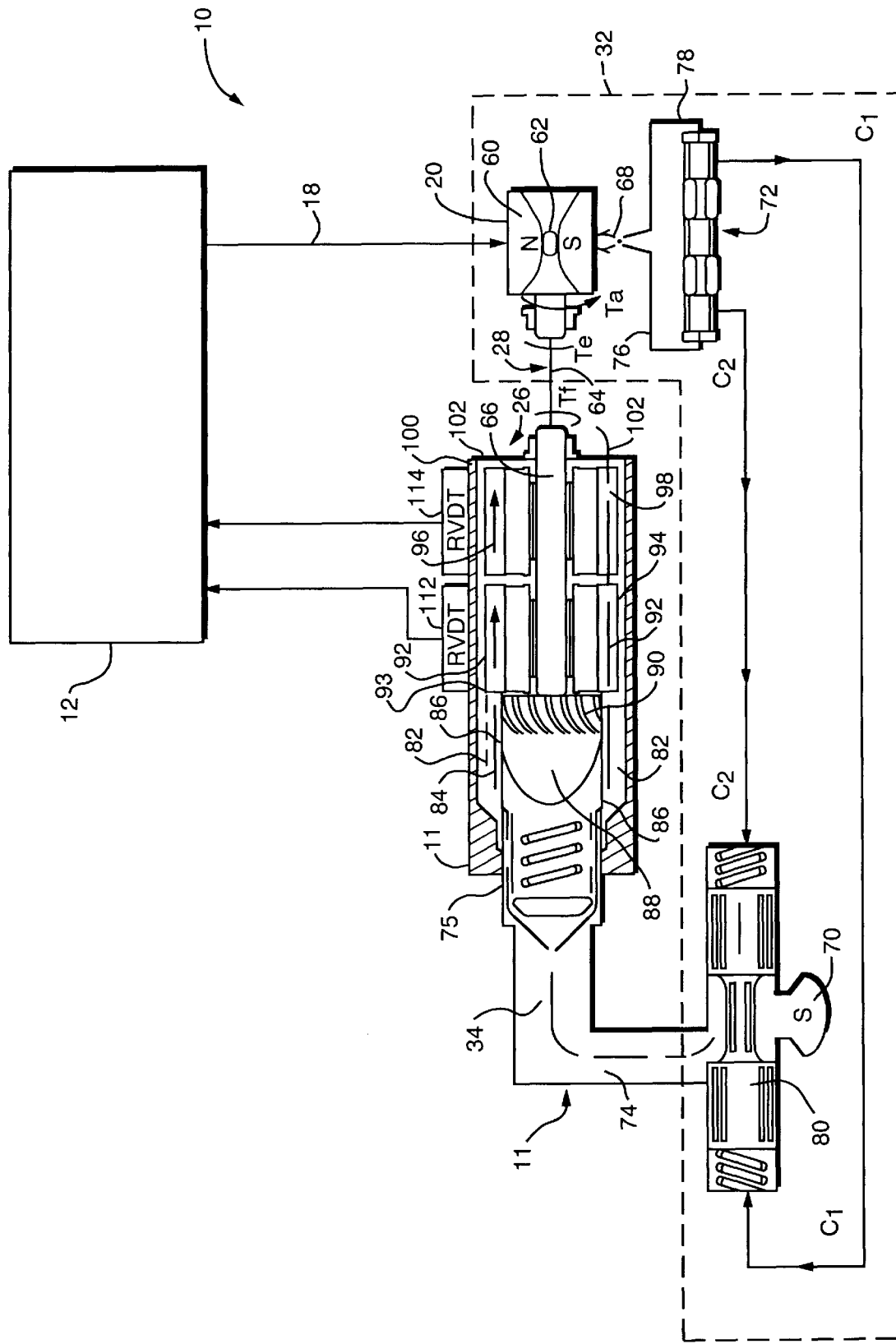
FIG. 2 is a more detailed, longitudinal cross-sectional, schematic diagram of preferred structures for implementing the functional components of the preferred embodiment of FIG. 1.

With reference being made to FIGS. 2–4, a more detailed description of preferred structures used to implement the functional components of embodiment 10 will now be presented. Embodiment 10 is mounted within housing 11 (e.g., made of metal and mounted in the engine fuel control) via conventional means. Preferably, the torque-controlled valve 32 of embodiment 10 comprises a conventional electromechanical armature-driven jet pipe means 60. Torque generator 60 received the command signal 18 and generates magnetic fields that apply torque to armature 62. Armature 62 is a conventional magnetic field-driven armature and receives the command torque 18 generated from the torque generator means 60 in the form of electrical currents proportional to the command torque 14 generated by the FADEC system 12. In response to current 18, armature 62 generates a proportional command torque (denoted by arrow $T_c$). Armature 62 is rigidly connected by conventional means to the torque summing means 28 (which comprises connecting spring 64 and shaft 66) so as to transmit torque Tc to torque summing means 28.

Jet pipe means 60 comprises a conventional fluid flow control jet pipe 68 connected to the armature 62 so as to be able to deflect proportional to control torque Tc generated by armature 62. Pipe 68 communicates with a conventional pressurized main liquid fuel supply 70 via a conduit (not shown) and with a conventional spool valve 72 for controlling the flowrate of fuel from the supply 70 to an inlet 74 of control system 10.

In operation, a relatively small amount of fuel flows from supply 70 through jet pipe 68 to differential control conduits 76, 78 of spool valve 72. Deflection of jet pipe 68 by armature 62 changes the relative amounts of fuel flowing from pipe 68 through conduits 76, 78 whereby to move spool valve 72 to generate differential fluid flows C1, C2 to control actuation of main supply piston valve 80. Opening of piston valve 80 allows fuel flow 34 from source 70 through inlet means 74. As will be appreciated, the flowrate of fuel admitted from the main supply 70 to the inlet 74 is a function of the position of valve 80 that is regulated by flows Cl, C2. These flows Cl and C2 are related to the relative amounts of fuel flowing from pipe through conduits 76, 78, which are controlled by deflection of the pipe 68 by armature 62. Thus, the flowrate of fuel admitted from source 70 to inlet 74 is related to and controlled the torque $T_c$ generated by electrical currents 18.

Fuel flow 34 passes through a conventional generally annular passage 82 bounded by conventional swirler means 84, fuel speed regulator means 86, and the housing 11. Preferably, swirler means 84 comprises a rigid metallic element of generally conical outer shape mounted via conventional means to shaft 66. The surface 88 of swirler 84 comprises a number of helical grooves (collectively referred to by numeral 90) for imparting to the fuel flow 34 an angular momentum and rotation as the flow 34 passes over the surface 88. The direction of rotation impressed on flow 34 is in the same direction as torque $T_f$ on shaft 66 (i.e., is opposite to the direction of command torque $T_c$). Number, spacing, and configuration of the grooves may vary depending upon the particular design constraints of the system 10, in ways apparent to those skilled in the art. Also, the general methods and approaches for regulating fluid rotation and/or angular momentum may vary depending upon the particular design constraints.

Conventional means 86 comprises a cylindrical piece of a resiliently flexible sheet metal or plastic sheet partially longitudinally mounted in housing 11. Preferably, means 86 extends from housing 11 to contact swirler 84 and close passage 82 in the absence of fluid flow 34. Upon being subjected to flow 34, means 86 deforms or bends as shown by dashed lines 86' to permit flow 34 to pass through passage 82, but resists to some extent the flow 34 of fuel through passage 82. Thus, means 86 regulate the speed of rotation of the rotor 94. This acts to increase the linearity of relationship between the mass flowrate of flow 34 and the feedback torque imparted on turbine 100. Thus, after passing through passage 82, flow 34 becomes flow 92 which has an angular momentum proportional to its mass flowrate, and rotor 94 speed of rotation. Thus, the regulator provides coarse regulation of rotation of rotor 94 over a wide range of fluid flows.

Flow 92 next passes through vaned annular passages 93 of conventional annular metallic rotor means 94, which passages 93 are oriented in substantially parallel to the axis of rotation of 94. Rotor means 94 is rotatably mounted on shaft 66 via conventional means (e.g., ball bearings, etc.), so as to be substantially free-spinning thereon, and acts to further smooth the rotating flow of fuel 92 (i.e., further acts to reduce its turbulence), and to regulate the velocity profile of the existing fuel so as to improve the accuracy of the angular momentum..

After passing through the rotor 94, the flow 92 thus becomes a smoother, regulated flow 96, which enters and passes through the vaned annular passages (collectively referred to by numeral 98) of conventional metallic turbine means 100, which passages 98 are oriented substantially parallel to the meter axis. Because the turbine 100 is essentially motionless (at steady state conditions) the angular momentum of the conditioned, rotating flow 92 is convected to a steady feedback torque Tf. Turbine vanes 98 essentially stop all rotation of fluid 92, as it freely passes axially. Turbine 100 is mounted to shaft 66 by conventional means, such as bearings, such that the torque Tf impressed upon the turbine is also impressed on the shaft 66. The fuel flow then exits the passages of the turbine free of rotation, and passes through exit passage 102 to the remote space (e.g., engine combustion space) to which it is intended to go.

The torque Tf impressed on the shaft 66 is transmitted to the armature 62 via the coupling spring 64. Since torque $T_f$ is opposite in direction to torque $T_c$ it counteracts (i.e., reduces or opposes) torque $T_c$. Thus, the total error torque $T_e$ generated by armature 62 and transmitted to the jet pipe means may be expressed as $T_e = T_c - T_f$.

In accordance with this embodiment of the present invention, various system parameters (enumerated below) must be carefully determined, adjusted, and calibrated in order to substantially ensure that torques Tf and Tc vary inversely with respect to each other, such that under steady state conditions when the actual mass flowrate of the fuel substantially equals the requested flowrate, torques $T_f$ and $T_c$ substantially equal each other, and $T_e$ substantially equals zero. When $T_e$ equals zero, the amount of deflection of the jet pipe remains near zero, so that control flows Cl and C2 are zero, and the throttle valve 80 is stationary, and mass flowrate of the fluid from the supply remains constant at the requested mass flowrate. The system parameters which must be controlled will be apparent to those skilled in the art, and include the inertias of the turbine, rotor, and torque summing means, the natural frequencies thereof, the frictional characteristics of the valves of the system, time constants of the elements of the system, and so forth. The actual values of these system parameters may vary quite widely depending upon design constraints, so long as the foregoing constraints and features of the present invention are satisfied.

Embodiment 10 also comprises conventional means 112 and 114 for detecting the rotational speed of rotor 94, and the rotational speed of the turbine 100, respectively. Means 112 and 114 preferably comprise primary sensors and a backup or redundant sensors which are mounted to pressure housing 11 outside the rotor. Sensors 112 and 114 preferably comprise conventional RVDT-type sensors for electromagnetically measuring the angular speed and position respectively. These measurements are used by the speed compensation 16 to calculate (or otherwise determine) the torque command signal 18. Sensors 112 and 114 can be either single or dual redundant.

Another feature of embodiment shown in FIG. 3, is that summing means 28 comprises both coupling torsion spring means 64 (in seal tube 65) and shaft 66 which are connected together via conventional connector 69. Preferably, spring means 64 is made of NiSpan-C and has a spring stiffness constant of about 5 to 10 in-pounds/radian, preferably about seven inch-pounds/radian and a natural frequency of about 120 Hz. Advantageously, it has been found that by adapting spring 64 to have these properties, the total adjusted torque along the summing means 28 may be made substantially proportional to the angle of rotation thereof. This permits the overall linearity of the transfer function of input signals 18 to actual flowrate to be improved in system 10. Alternatively, if appropriately modified, the spring means 64 maybe wound around the turbine, and shaft 66 may directly connect the turbine to the armature 62.

Figure 5:
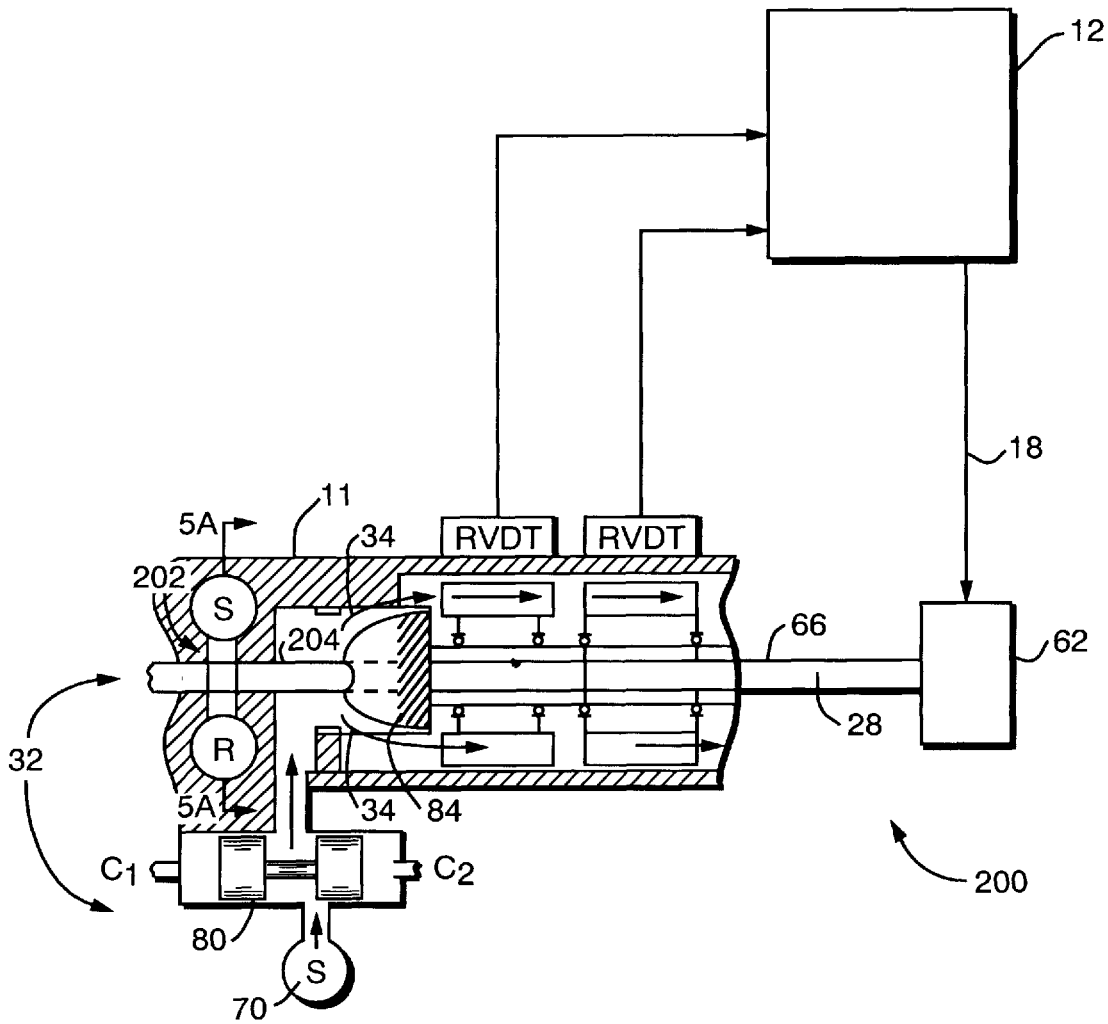
FIG. 5 is a longitudinal cross-sectional schematic diagram illustrating a variant of the preferred structure of FIGS. 5A—5A.
Figure 5A:
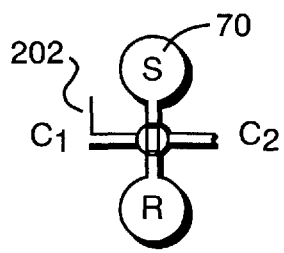
FIG. 5A is a cross-sectional drawing taken along lines A—A of FIG. 5.

Thus, it is evident that there has been provided a system and method for controlling fluid flowrate that fully satisfies both the aims and objectives hereinbefore set forth. Many modifications of the above-presented preferred embodiment are possible without departing from the present invention. For example, a variant of the preferred structure of FIGS. 2–4 is shown in FIGS. 5 and 5A, the elements and function of which variant 200 are substantially the same as in embodiment 10, except that in variant 200, the torque-controlled valve 32 comprises a conventional four-way valve 202 (rather than a jet pipe means and spool valve) driven by an extended portion 204 of the shaft, which valve 202 controls differential control flows C1, C2 for controlling the main supply piston valve. As is known to those skilled in the art, the flowrate of fuel admitted by a conventional 4-way valve is related to the angular position of the 4-way valve. Thus, embodiment 200, when the shaft is caused to rotate by the command torque generating motor 20 (in response to command flowrate signals 18), the extended portion 204 of the shaft actuates the valve 202 to generate fluid flow from the source into the inlet. After being treated by the other elements of the embodiment 200 in the manner described above in connection with the embodiment 10, the flow enters the turbine which generates the feedback torque which opposes the command torque of the motor 62. As is true of operation of embodiment 10, when the mass flowrate of the fluid is substantially equal to the requested flowrate, the counter acting feedback torque generated by the turbine is substantially equal to that of the armature torque. This stops rotation of the 4-way valve so that the amount of fuel being admitted to the inlet (i.e., the actual flow rate) remains constant and substantially equals the requested flow rate.

Further modifications are also possible without departing from the present invention. Therefore, it is intended that the subject invention be viewed broadly to encompass all such modifications, and that it be defined only by the hereinafter appended claims.

What is claimed is:
1. A fluid flowrate control system, comprising:
   a. means for generating a command torque related to a commanded flowrate of fluid to be released from a source of said fluid;
   b. a torque-controlled valve for releasing an actual flowrate of said fluid from said source in response to said commanded torque;
   c. means for generating a feedback torque related to said actual flowrate, said feedback torque being opposite in direction to said command torque; and
   d. means for summing said feedback torque to said command torque to reduce said command torque by said feedback torque whereby to adjust actual flowrate of fluid released by said valve as a function of said feedback torque.
2. A system according to claim 1, wherein said torque-controlled valve comprises a four-way valve driven by a shaft.
3. A system according to claim 1, wherein said torque controlled valve comprises a main fluid control valve driven by a spool valve.
4. A system according to claim 1, wherein said command torque generating means comprises an electromagnetic armature for generating said command torque in response to a commanded mass-flowrate signal related to said commanded flowrate.
5. A system according to claim 1, wherein said summing means comprises connecting shaft means.
6. A system according to claim 5, wherein said connecting shaft means comprises spring coupling means.
7. A system according to claim 6, wherein said spring coupling means has a spring constant adapted to make torque acting along said connecting shaft means substantially proportional to angular rotation of said shaft means.
8. A system according to claim 1, wherein said feedback torque generating means comprises an angular momentum flowmeter.
9. A system according to claim 1, and further comprising means for imparting to said flow of fluid an angular momentum related to said actual flowrate.
10. A fluid flow control system, and comprising:
    a. means for generating a commanded flowrate signal related to commanded flowrate of a fluid from a fluid source;
    b. means for generating a command torque related to said requested flowrate in response to said requested flowrate signal;
    c. a torque-controlled valve for being actuated by said command torque to release a flow of said fluid having an actual flowrate;
    d. means for imparting to said flow an angular momentum related to said actual flowrate;
    e. means for negating said angular momentum of said fluid flow by generating a feedback torque therewith opposite in direction to said command torque; and
    f. means for summing said feedback torque to said command torque to reduce said command torque by said feedback torque whereby to adjust said actual flowrate of said fluid as a function of said feedback torque.
11. A system according to claim 10, wherein said command torque generating means comprises an electromagnetic armature.
12. A system according to claim 10, wherein said means for imparting said angular momentum to said fluid comprises swirler means.
13. A system according to claim 10, wherein said means for generating said feedback torque comprises a vaned annular passage.
14. A system according to claim 10, wherein said summing means comprising shaft connecting means for generating said error torque.
15. A system according to claim 14, wherein:
    i. said controlling torque generating means comprises an electromagnetic armature responsive to said commanded flowrate signal; and
    ii. said shaft connecting means connects said armature to a turbine.
16. A system according to claim 10, wherein said torque-controlled valve comprises a jet-pipe.
17. A system according to claim 10, wherein said torque-controlled valve comprises a multi-way valve.
18. A system according to claim 14, wherein said shaft means comprises a spring coupling means.
19. A method for controlling fluid flow, and comprising:
    a. generating a command torque related to a commanded mass-flowrate of a fluid from source;

b. applying said command torque to a torque-controlled valve to release a flow of fluid from said source at an actual mass-flowrate;

c. generating a feedback torque related to said actual mass-flowrate, said feedback torque being opposite in direction to said command torque; and d. summing said feedback torque to said command torque to reduce said command torque by said feedback torque whereby to adjust actual mass-flowrate of fluid released by said valve as a function of said feedback torque.

20. A method according to claim 19, wherein said generation of said command torque comprises actuating an electromagnetic armature with a command torque signal related to said command flowrate.

21. A system according to claim 1, wherein said feedback torque generating means comprises a turbine and said system further comprises a turbine speed sensor and a compensator for damping turbine rotation.

* * * * *